United States Patent [19]

Schmidt

[11] Patent Number: 4,651,372
[45] Date of Patent: Mar. 24, 1987

[54] PLASTIC BEE COMB AND METHOD FOR BREEDING MORE EFFICIENT AND MORE RESISTANT BEES

[76] Inventor: Matthias Schmidt, Dachsbaustrobe 9, 6950 Mosbach-Wallstadt, Fed. Rep. of Germany

[21] Appl. No.: 757,957

[22] Filed: Jul. 23, 1985

[30] Foreign Application Priority Data

Nov. 24, 1983 [DE] Fed. Rep. of Germany ....... 3342485

[51] Int. Cl.⁴ .............................................. A01K 47/04
[52] U.S. Cl. ................................................. 6/11; 6/9
[58] Field of Search ..................................... 6/9, 10, 11

[56] References Cited

U.S. PATENT DOCUMENTS 2,223,561 12/1940 Garriga ................................. 6/11 X
4,392,262 7/1983 Stickler ........................................ 6/9

FOREIGN PATENT DOCUMENTS 161684 4/1921 United Kingdom ...................... 6/11
592090 9/1947 United Kingdom ...................... 6/11

Primary Examiner—Robert P. Swiatek
Attorney, Agent, or Firm—Karen M. Gerken; Marty P. Hoffman; Mitchell B. Wasson

[57] ABSTRACT

A plastics comb comprising a center wall and cell walls with normal height at both sides of the center wall is made-up of seveal parts. An injection-moulded center wall and injection moulded cell walls, which are produced separately are connected with each other. The diameter of the cell chamber at the bottom of the cell is larger than that of the cell opening. For breeding queens corresponding combs are provided with a center wall and with cell walls at one side thereof, which are removable from the center wall. The individual cells have cell bottoms, which are entirely or partly exchangeable, for example, as a locking element separate from the cell bottom.

12 Claims, 12 Drawing Figures

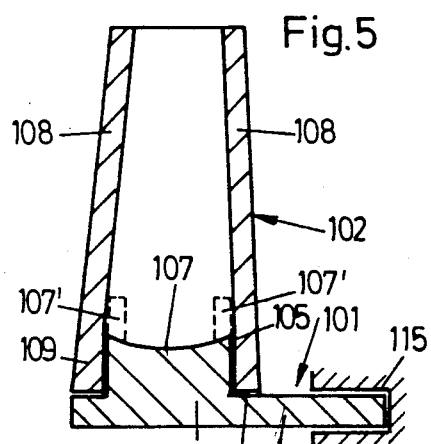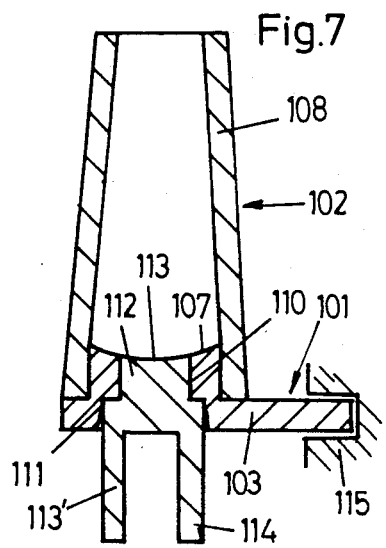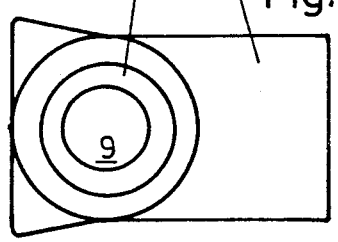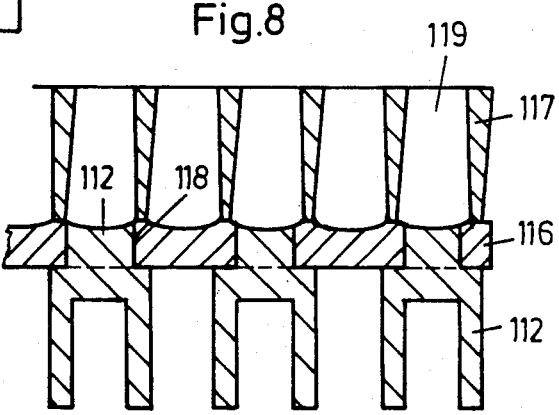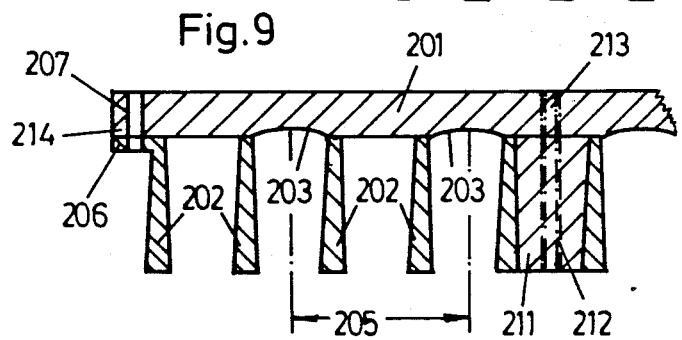

PLASTIC BEE COMB AND METHOD FOR BREEDING MORE EFFICIENT AND MORE RESISTANT BEES

BACKGROUND OF THE INVENTION

1. Field of the Invention

This invention refers to multipart combs made of plastics material with normal height cell walls, with a centre wall and with removable cell walls for breeding more efficient and more resistant bees.

2. Description of the Prior Art

Combs made of plastics material are known but there are moulded in one piece. They have very limited stability and cannot be produced economically.

Furthermore, combs are known, which are produced by injection moulding from plastic material. If produced with normal height of the cell walls (approx. 12,5 mm) production of the combs is very complicated. Accordingly combs have been produced by injection moulding with considerably reduced height of the cell walls (approx. ⅓ of normal height) according to German Pat. No. 21 18 676. Production of this type of combs is complicated, too, and it is necessary to make the cell walls with a diameter increasing from the bottom of the cell outwardly.

Apart from producing such combs there exists the problem of the Varroa mites which have disastrous effects. Nowadays, these mites are controlled by chemical means, against which the mites become resistant and which poison the honey and the brood. Those bees, which are attacked by the Varroa mites within the cells are weakened and susceptible to other bee diseases.

In the long term combating the Varroa mites effectively will be possible only if the resistivity of the growing bees is improved. Optimal nutrition of the maggots and young bees with feeding juice within the cells is guaranteed, if sufficient feeding juice is available at all times. The feeding juice is far more durable within combs made of plastics material than within wax combs.

Furthermore, it is known to combine centre wall combs with cell walls on one side to full plastics combs and to provide them with openings, which can be closed by plugs. The inner side of the plug forms the deepened bottom of the cell, which accommodates the bees' eggs and the maggots grown therefrom as well as the feeding juice. The plugs together with the maggots and the feeding juice is taken from the workers' cells and is transferred to corresponding openings of equal size in the bottoms of the queens' cells. This method is time-consuming because each plug has to be transferred individually.

SUMMARY OF THE INVENTION

It is an object of this invention to provide injection moulded plastic combs with normal height cell walls, which have an as large as possible a volume at the bottom of the cell for accommodating the feeding juice and the maggots.

It is another object of the invention to provide combs, which can be produced and assembled in an economical and simple manner, which are of light weight and which are inexpensive.

A further object of this invention is to propose a shape for the cells so that the maggots grow optimally and that the maggots close and reopen the cells earlier than with normal cells and under normal conditions.

Moreover, it is an object of this invention to propose a method for biologically combating the Varroa-mites by using multipart plastics cells according to this invention.

It is also an object of this invention to propose queens' cells for breeding most efficient queens and to form common injection moulded plastics cells in such a manner that transferring the queen maggots to the queens' cells is made under optimum conditions.

According to this invention we propose to provide combs made from plastics material with normal height cell walls and with a central wall as well as cell walls at both sides thereof in such a manner that they are formed from an injection-moulded centre wall as well as separate, injection moulded cell walls, which are removably connected with the centre wall. Preferably, the cell walls are loosely contacting the centre walls and the centre wall itself as a unit is fastened with predetermined cells.

Furthermore, according to this invention the diameter of the individual cells is larger at the bottom of the cells than at the opening of the cells, and the cell walls are outwardly converging with increasing wall thickness. With a special embodiment the cell walls are provided with two sections, which are injection-moulded as a unit, one of which sections widens slightly outwardly from the cell bottom, and the other of which tapers outwardly with decreasing wall thickness; the outer wall section tapers faster than the inner wall section.

The method for breeding more effective and more resistant, stronger bees includes the steps of forming the cell spaces, which take up the maggots, in such a manner, that the diameter decreases outwardly from the bottom of the cell, forming the cells at the open end with a diameter of approx. 5,4 mm, producing the cell walls separately from the cell bottom, assembling the cell walls and the cell bottom to form a plastics comb, and providing the cell bottom with a depression, which increases from the cell walls to the centre, for accommodating the feeding juice and the maggot.

The comb according to this invention allows the cell chambers to be disposed on either side of the centre wall with a diameter decreasing from the bottom outwardly. The centre wall and the cell walls at both sides of the centre wall are symmetrically formed. The cell walls can be made at any suitable angle in one piece. They may also be subdivided in height, but in this event clamping means embracing the entire comb will be required.

Increasing the thickness of the centre walls outwardly from the bottom of the cells formed within the centre wall is chosen so that the diameter of the cell at the bottom is about 7 mm and at the outer, open end is about 5,4 mm. The larger diameter of the bottom of the cell results in a large area of the cell bottom and the cell chamber joining the bottom for accommodating a larger amount of feeding juice for optimally feeding the maggots and the young bees. More feeding juice means better nutrition for the maggots; it results in more healthy and more resistant maggots and young bees. These maggots and young bees require a larger space or chamber than smaller, weaker bees. Because the width of the opening of such cells at the free entrance end corresponds to the normal cell diameter the feeding bees and the queen accept such cells as natural cells.

The injection moulded cell walls at both sides of the centre wall are removably fastened to each other in order to be able to remove the skins from the cell walls, which skins are formed as a result of the hatching of the maggots and in order to enable the beekeeper to clear the comb. The cell walls and the centre wall are connected to each other for example by using plugging or screwing means, locking means or the like or by using frame-like clamping means. The queen's cells according to this invention allow optimal living conditions for the queens maggots in view of the larger space and feeding juice available. Dividing the individual queens' cells into two parts is the only possibility for making the combs from plastics material.

The bottom section of the queen's cell alternatively can be a one-piece solid element or an element with a bore, which can be closed by a plug, for transferring the queen maggots. The plug is made in such a manner that it can be plugged into corresponding bores of the centre wall of a plastics cell with cell walls on one side of the centre wall and can be transferred together with the plug element into a queen's cell.

If the cell walls are connected with the centre wall so that they can be substituted by cell walls of different dimensions, plugs are not necessary. This results in a by far more simple production and faster handling when transferring the maggots; furthermore, in view of the larger diameter of the cell chamber at the bottom of the cell compared with the diameter of the opposite free end by far more space is available for the feeding juice and the maggots. The cell walls of the workers' cells and also of the queens' cells together form an integral unit and are screwed, plugged or in other manner releasably connected to the centre wall.

With the proposed multipart plastics combs optimum living conditions are obtained for the maggots in the bottom area within the cells by providing as large a chamber as possible for obtaining the feeding juice, whereas the tapering of the cell walls outwardly makes it easier for the young bees to hatch; in addition the amount of material as well as the weight of the combs can be decreased. Furthermore, within a predetermined area a larger number of cells can be provided compared with normal structures. In particular, in view of the improved living conditions bee maggots will require only four (compared with the present six) days for closing the cells, and only 10 (compared to the present 12) days until the maggots hatch. The total developing time of the bees by using the plastics comb according to the invention is 17-18 days, with normal plastics combs or wax combs 21 days. This is of utmost importance for the successful combatting of the Varroa mites, because these mites lay their eggs and hatch according to the cycle of the development of the bees. In view of reducing the time period for reclosing the cells by the bee maggots and for hatching of the bees, any increase in the Varroa mites will be avoided because of lack of mating opportunity.

Practical experiments have shown that based on the structure of the combs according to this invention the bees normally producing feeding juice, especially for the queen will also supply this feeding juice to all bees. This queen's feeding juice which is of especially high quality has the effect that the bees develop faster and live longer, that stronger swarms are formed, that the honey output is multiplied and that in particular the bees will have no desire to swarm, which is a revolutionary advance and an important time saving for the beekeeper.

BRIEF DESCRIPTION OF THE DRAWINGS

FIG. 5 is a cross section view of a queen's cell, FIG. 6 is a top view of the cell according to FIG. 5, FIG. 7 is a queen's cell with inserted plug, FIG. 8 is a plastics comb according to FIG. 1 with centre wall and queen cells on one side thereof, FIG. 9 is a further embodiment of a comb according to this invention with a cross-section through the centre wall and cell walls for a comb with workers' cells.

DESCRIPTION OF THE PREFERRED EMBODIMENTS

Figure 1:
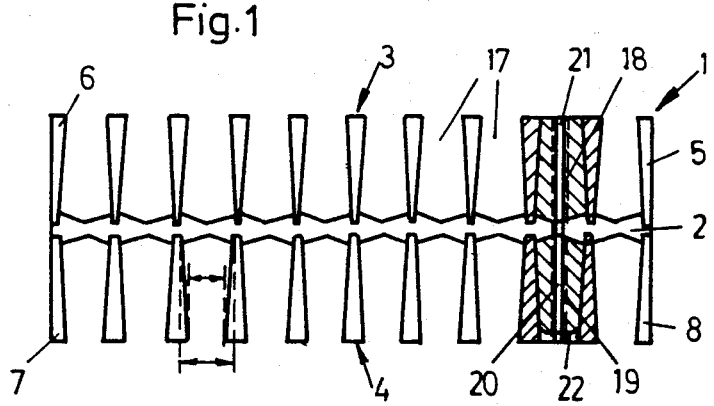
FIG. 1 is a partial cross-section view of a plastics comb according to this invention.
Figure 2:
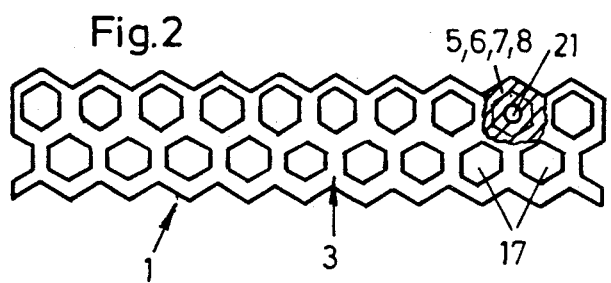
FIG. 2 is a top view of the comb of FIG. 1.
Figure 3:
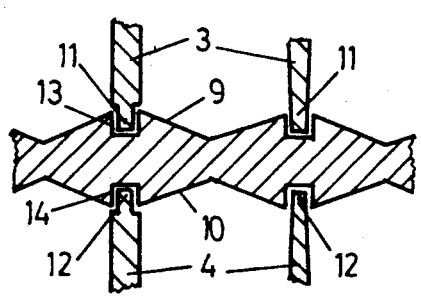
FIG. 3 is on an increased scale a section view of the comb shown in FIG. 1.

The plastics comb 1 (FIG. 1) consists of a centre wall 2 and cell walls 3 and 4 extending on either side of the centre wall 2. The individual cell walls 3 and 4 converge from the centre wall 2, and have a larger diameter at the bottom than at their open end. The increasing thickness of the walls 3 and 4 from the bottom outwardly preferably is continuous and linear. The outermost cell walls 5, 6, 7 and 8 are planar on their outside. The centre wall 2 is symmetrically formed at both sides from the cell walls 3 and 4 so that the bottoms 9, 10 of the cells, which deepen symmetrically towards the centre of the bottom are arranged opposite to each other. The cell walls 3, 4 are inserted into slots 13, 14 of the centre wall by means of lugs 11, 12. The lugs 11, 12 can be arranged within the slots 13, 14 by being inserted, glued, locked, or can have loose contact. It only matters that this connection is detachable so that the centre wall 2 can be assembled with the cell walls 3, 4 and can be disassembled.

Figure 4:
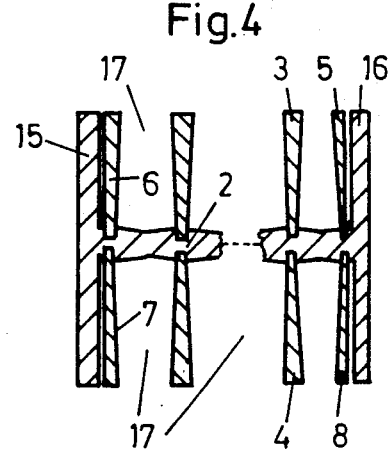
FIG. 4 is a schematic picture of a clamping frame for a comb shown in FIG. 1.

FIG. 4 shows how the cell walls 3 and 4 are clamped with the centre wall. The centre wall 2 is provided with end supports 15, 16, which engage the outer surfaces of the walls 5, 6, 7, 8. The connection of the clamping elements 15, 16, with the centre wall is either to one-piece or by screwing, glueing or separately fastening the clamping elements 15, 16 with the centre wall. Connection of the supports 15, 16 with comb 1 can be such that the supports are simple plates 15, 16 provided with bores through which they are screwed to the centre wall 2. Preferably the diameter of the individual cells 17 in the bottom area of the cell is about 7 mm and at the opposite, open end about 5,4 mm (=inner diameter of a conventional cell).

One form of connection of the cell walls 3 and 4 to each other and to the centre wall 2 is shown in shade in FIG. 1. An upper and a lower cell of the section 3 and 4 are solid by being injection moulded at various positions. These solid cells and the centre wall 2 bores 18, 19 are provided, which accommodate screws 20 with countersunk screwhead 21 and nut 22. The cell walls 3, 4 can be butt-jointed with the centre wall.

The comb made of plastics material can be arranged as a drone comb. Drone combs separate from normal combs have the advantage that the queen no longer lays her drone eggs into those cells assigned for the worker bees, but exclusively into the cells of the drone combs, which as a unit are inserted into good and strong bee swarms. As the worker cells of the plastics comb according to this invention have a diameter at the frame opening of the same size as a normal cell (approx. 5,4 mm) the queen does not lay drone eggs into these cells, which seem to be too small for drones.

The queen's cell according to FIG. 5 and 6 consists of a lower section 101 and an upper section 102 which is removable, for example insertably connected with section 101, which consists of a connection plate 103 and an extension 104 extending into the cell chamber with a cylindrical lateral wall 105, which joins plate 103 at 106. The upper side 107 of extension 104 facing the inner space of the cell is of basin-type shape and receives queen's maggot and feeding juice. The basin-type upper side 107 can be provided with an increased perpheral rim 107'; the upper section 102, which forms cell wall 108, is of tubular shape and deceases in diameter with increasing distance from the lower section 101. Within area 109 the inner cell wall is cylindrically formed in order to be slipped onto extension 104 so that between extension 104 and cylinder wall 108 a proper registering is obtained. Both coacting areas 105, 109 can be locked when brought into engagement, for example by means of tonques provided on one surface, which engage corresponding grooves on the other surface.

The embodiment according to FIG. 7 corresponds to that of FIG. 5 with the difference that with the lower section 101 at the extension 104 a bore 110 is provided, which is widened at 111. Bore 110, 111 takes up a locking element 112, for example a plug. Surface 113 of the plug facing the interior chamber of the cells is deepened like a basin in order to obtain a uniform transition to the basin-like depression 107. Plug 112 at its outer portion is provided with fork arms 113' and 114 which serve as a grip. Plate 103 is used for inserting the queen's cell into a nut of the breeding frame 115.

FIG. 8 shows a comb with centre wall 116 and cell walls 117 on one side thereof. Centre wall 116 has bores 118, the diameter of which corresponds to bore 110 of the queen's cell according to FIG. 7 so that plugs 112 fit into bores 118. The worker bees lay the eggs into cells 119 and subsequent thereto the plugs 112 together with the eggs or maggots and the feeding juice are transformed into the queen's cells 101, 102.

Figure 10:
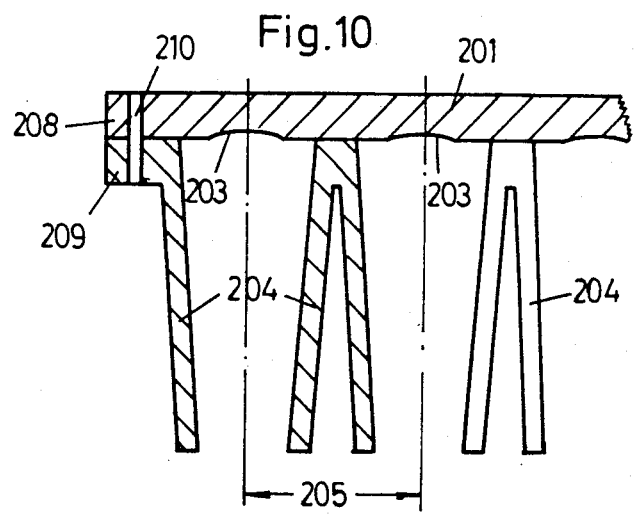
FIG. 10 is a corresponding section of the same centre wall with cell walls of queens' cells.

In FIG. 9 the cell walls 202 are connected to the centre wall on its lower side. The cell wall 201 has concave depressions 203 which form the bottom of workers' cells. Cell walls 202 are disconnectable from centre wall and will be removed from centre wall 201 after the queen has laid eggs into the workers' cells formed by cell walls 202, 203 and centre wall 201 and subsequent to the maggots having hatched from the eggs, and will be substituted by the larger cell walls 204 of the queen's cells. Cell walls 202 and 204 form an integral unit for the entire queen's breeding comb. The concave depressions 203, 203 have a distance 205 from each other, which is equal to twice the diameter of a worker's cell and the same diameter as a queen's cell. With the queen's cell formed by centre wall 201 and cell walls 204 the depression 203 only occupies part of the entire bottom of the cell. Cell walls 202 and 204 increase in thickness outwardly from the center wall 201 so that the workers' cells and the queen's cells obtain a cell chamber the diameter of which decreases from the bottom outwardly. This results in a larger chamber within the area of depression 203 for accommodating the feeding juice and the maggot, which is important for improved feeding and growing of the maggot. Centre wall 201 and cell walls 202, 204 are made of injection moulded plastics material. Cell walls 202, 204 and centre wall are screwed together or fastened together. In FIG. 9 there is an edge area 214 of the centre wall 201, whereas 206 is a flange-like extension of the natural walls 202. Both extensions 214, 206 abut against each other and are provided with bores 207, through which screwing elements are inserted which hold both parts together. According to FIG. 10 the centre wall has a rim portion 208 to which a flange-like ring extension 209 of the natural walls 204 is coordinated so that both are provided with congruent bores 210 for fastening screws or pins. The two rim portions 214, 206 or 208, 209 also can be removably fastened by means of clamps or the like. In addition or alternatively according to FIG. 9 some of the cell chambers can be poured-out with plastics material 211; centre wall and cell walls are removably connected with each other by means of bores 212 and screws 213 or locking elements.

Combs for breeding workers for example are of square shape and include about 11 or 12 cells or cell walls 202, whereas the queen's cells in view of their larger dimensions with equally dimensioned centre wall 201 only are provided with half the number of cells, which means that with 12 workers' cells six queen's cells in longitudinal direction or 144 workers' cells compared with 36 queen's cells are provided within the entire comb.

Figure 11:
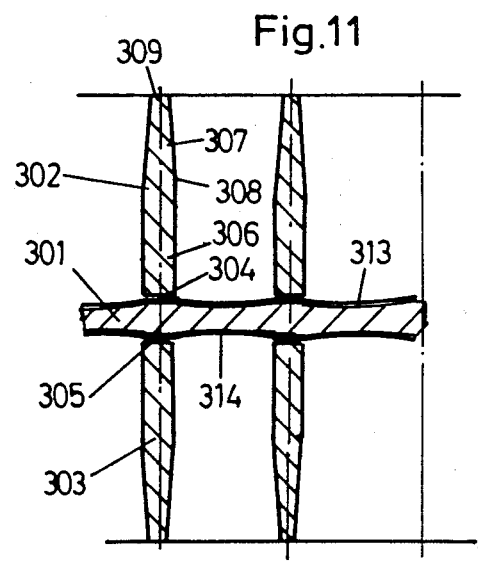
FIG. 11 is a cross sectional view through a different embodiment of a multi-part comb according to this invention and, FIG. 12 is a detail of the entrance of a comb on an enlarged scale.
Figure 12:
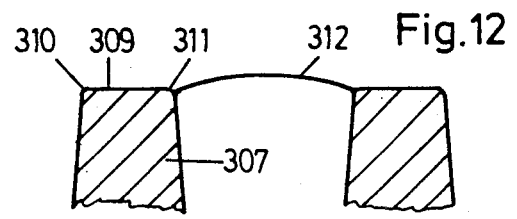

According to FIG. 11 at both sides of the centre wall 301, side walls 302, 303 of the bee cells are provided, which are loosely contacting the upper side of the centre wall 301 at 304, 305. Walls 302, 303 are provided with an inner section 306 and an outer section 307; inner section 306 widens from the centre wall 301 slightly outwardly up to point 308 and joins the outer section 307, which narrows outwardly up to the face side 309 more quickly than section 306 widens. Edges 310 and 311 of the face side of the side walls are rounded and are stretched by a skin 312 according to FIG. 12. Because the maggots pierce through the skin when hatching they have a better access to the rim of the skin at the point of connection with the cell wall. Centre wall 301 can be covered by a layer 313 of wax, especially at the depressions 314 forming the bottom of the cells.

What we claim is:

1. Method of breeding larger and more efficient queen bees, characterized in that the queen maggots are removed from the workers' cells of normal combs, that the queen maggots so removed are placed on a removable cell bottom of greater diameter and that the cell bottom with a tubular side wall is combined to form a queen's cell in which the maggot develops into the queen.

2. Method of breeding larger, more resistant and more efficient queen bees in plastics combs with centre wall and cells on one side thereof, characterized in that the centre wall of the plastics comb is connected with cell walls corresponding to the dimensions of workers' cells, that these cells are provided with eggs, that subsequent to the hatching of the maggots from these egges the cell walls are removed and are substituted by cell walls with the dimensions of queen cells, and that the young queens subsequent to their hatching from the maggots are developed within the cell bottom of increased diameter of the queen cells with an excess of feeding juice.

3. Plastics comb for carrying out the method according to claim 2 consisting of a comb centre wall and first cell walls provided on one side thereof, characterized in that the first cell walls are connected with the centre wall so that they can be removed and exchanged with second cell walls of different dimensions, that the first cell walls have the dimensions of cell walls for workers' cells and the second cell walls have the dimensions of cell walls for queen cells, and that the cells formed by the second cell walls are of twice the diameter compared with the cells formed by the first cell walls.

4. Plastics comb according to claim 3, characterized in that the cell walls are a unit which on its periphery is provided at least partly with a reinforcing rim which includes bores or recesses for screws by means of which the cell walls are fastened to the centre wall having corresponding bores or recesses.

5. Bee comb made of plastic material for breeding bees, the cells of said comb comprising a center wall and cell walls at both sides of said center wall, said center wall and said cell walls being molded separate from each other and being fastened to each other before being used in a beehive, said cell walls of a cell converging from the bottom of the cell outwardly to the opening of the cell, said bottom of the cell sloping downwardly from said cell walls towards a center point.

6. Bee comb according to claim 5 wherein said cell walls are removably connected with said center wall by means of connectors and said center wall and said cell walls are provided with complementary mating formations.

7. Bee comb according to claim 6 wherein said complementary mating formations are constituted by slots and lugs respectively.

8. Bee comb according to claim 5 wherein opposite predetermined cells of said center wall are at least partly injection-molded as solid parts, said solid parts being provided with bores, the opposite solid parts being connected and locked to each other by fasteners extending through said bores and correspondingly aligned bores within the center wall.

9. Method for breeding more resistant bees by using plastic bee combs according to claim 5 wherein
(a) the cell walls of each cell are made in such a manner that they converge from the bottom of the cell outwardly to the opening of the cell and that the diameter of the cell decreases away from the cell bottom,
(b) the cells are formed with a diameter of about 5.4 mm at their open ends and with a diameter of about 7 mm at the bottom of the cell,
(c) the cell walls are produced separately from the cell bottom and are assembled and fastened to form the plastic comb, and
(d) the cell bottom is provided with a recess increasing in depth from the cell walls to the center for receiving feeding juice.

10. Plastic bee comb according to claim 5 wherein the cell walls are butt-joined to the center wall with their front wall in such a manner that no fixed connection is provided between the center wall and the cell walls, the cell walls at both sides of the center wall are fastened as a unit with the center wall at predetermined cells, and the cell walls consist of two sections which are both formed as one unit, whereby a first section adjacent the center wall widens slightly outwardly from the cell bottom and a second outer section narrows at a higher rate outwardly from the outer end of the first section.

11. Queen's cells with normal wall height for breeding more resistant and more efficient queen bees wherein each cell comprises a lower plastic section forming a cell bottom having a bore therein and a tubular upper plastic section forming the queen's cell, said lower and upper plastic sections being injection-molded, said plastic sections being loosely connected to each other, the lower section of the individual cell being formed of a plate with a cylindrical extension occupying part of the plate, and the upper surface of the extension is provided with a basin-like recess for accommodating the queen's maggot and feeding juice.

12. Queen's cells according to claim 11 including a plastic bee comb which comprises a center wall with bores for locking elements and cell walls extending on that side opposite to said lower section of the elements, the thickness of said cell walls increasing as said cell walls extend from said center wall, and the diameter of the bores within said center wall is equal to the diameter of the bore of said lower section and also is equal to the diameter of said locking element so that the locking elements alternatively can be used for the queen's cells as well as for the bee cells of the bee comb with center walls.

* * * * *